Dec. 8, 1953 H. B. R. BOOSMAN 2,662,182
GENERATION OF ELECTRIC OSCILLATION
Filed Feb. 21, 1950

INVENTOR
H. B. R. BOOSMAN

Patented Dec. 8, 1953

2,662,182

UNITED STATES PATENT OFFICE 2,662,182

GENERATION OF ELECTRIC OSCILLATION

Herman Bernard Rudolf Boosman, London, England, assignor to Hartford National Bank and Trust Company, Hartford, Conn., as trustee Application February 21, 1950, Serial No. 145,367

Claims priority, application Great Britain April 28, 1949

4 Claims. (Cl. 250—36)

Figure 2:
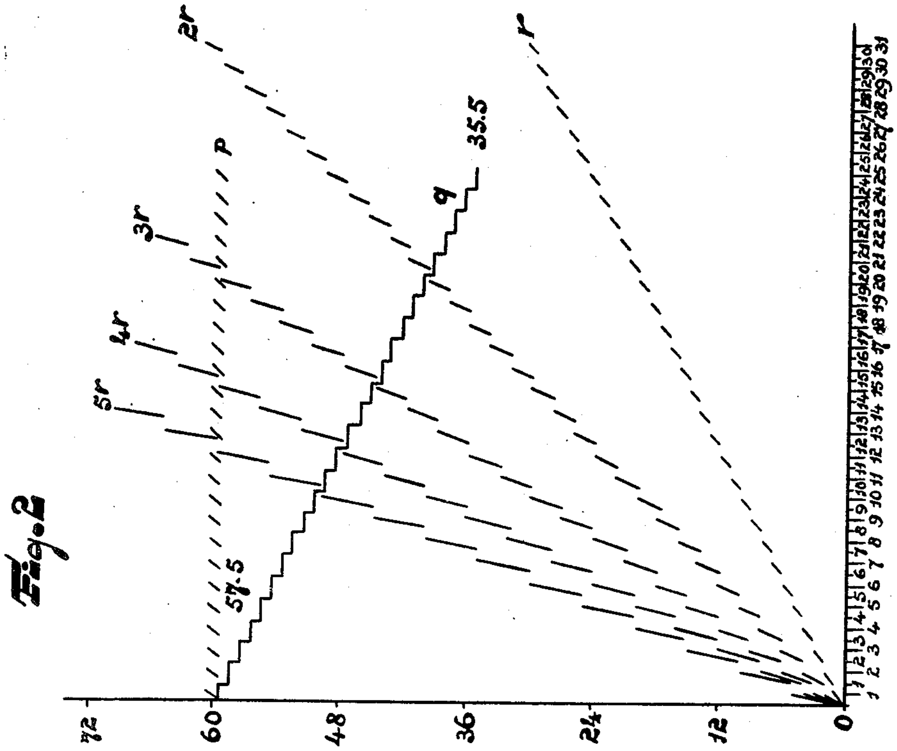

This invention relates to the generation of electric oscillations of accurately-determined frequency by the synthesis of two or more oscillations of other frequencies, the frequency of the resultant oscillations being continuously variable throughout a wide range. The object of the invention is to provide an improved method of overcoming the difficulties which arise from interaction between harmonics of the oscillations in question.

In the comparison method of stabilizing high-frequency oscillations throughout a wide range as in a wave-meter or radio transmitter, an oscillation whose frequency is to be stabilized is caused to beat with a harmonic of a crystal oscillator and the beat is used for effecting stabilisation. Thus in order to stabilise an oscillator at a frequency of 22,455 kc./s. a beat of 455 kc./s. is obtained by mixing the oscillation frequency with the 22nd harmonic of a crystal-controlled oscillator having a fundamental frequency of 1 mc./s. This beat is compared in a discriminator with an independent oscillation which has been set at 455 kc./s., and the output of the discriminator is used to control the frequency of said oscillator which thus acquires the same stability as the independent relatively low frequency of 455 kc./s.

When frequencies continuously variable over a wide band are required for a single-sideband transmitter with a wide and continuous frequency-range, the method which has just been described is not applicable, but a resultant stable oscillation may be obtained by mixing two component oscillations, one of which is continuously variable throughout a small sub-range and the lates to a method of or means for generating other discontinuously variable.

More particularly therefore, the invention re-oscillations wherein a frequency (hereinafter termed the "resultant frequency") can be varied continuously throughout a relatively wide range, is generated by mixing a first component oscillation whose frequency (hereinafter termed the "first component frequency") can be varied continuously throughout a relatively narrow sub-range, with a second component oscillation whose frequency (hereinafter termed the "second component frequency") can be varied discontinuously in steps, the frequency width of each of which is equal to the frequency width of the said sub-range.

Difficulties arise, however, because of beats between harmonics of the frequencies concerned. The object of the invention is to overcome these difficulties in a simple and convenient manner. One method of avoiding such beats has been set forth in the specification accompanying the co-pending application No. 680,899 (PH. 8399) made by one of the present applicants, in which the continuously variable frequency is tunable throughout each of two or more frequency bands having substantially the same width, and the desired values of the resultant frequency are derived by so choosing one of these frequency bands for combination with each of the discontinuous frequencies that interference between harmonics is substantially suppressed. This method is very satisfactory under some conditions, but the present invention enables the desired result to be attained with only one continuously-tunable frequency band and thus avoids the use of a range switch for the continuously-tunable frequency. Moreover, the present invention effects a reduction in the requisite number of other circuit components and enables the requisite frequency-selection to be systematically calculated. The present invention requires in general the use of values for the continuously-variable frequency which are higher than those required according to the above-mentioned co-pending application, and in some circumstances the advantage may accordingly rest with the latter; in other circumstances, however, such relatively high values may even be advantageous in eliminating interference between the continuously variable frequency on one hand and beats between harmonics of the resultant and discontinuously-variable frequencies on the other hand. The invention makes use of a relatively small range for the discontinuous frequency.

The conditions under which the rules prescribed by the invention are to be preferred to other modes of selecting the frequencies will be readily understood by those skilled in the art in the light of the following discussion.

Let $p$ be the higher component frequency, $q$ the lower component frequency, and $r$ the resultant difference frequency, $n$ being an integer which represents the order of harmonics of the frequency concerned.

Then beats will occur if $$np \approx r$$

(1)

$$nq \approx r$$

Beats with the nth harmonics of $p$ and $q$ can be avoided by arranging that $p$ and $q$ shall both lie above the maximum value of $r$, thus:

$$p>r_{max}$$

and $$q>r_{max}$$

But now a further difficulty arises since the harmonics of $r$ may beat with $p$ and/or $q$ so that for the nth harmonic of $r$:

$$p \approx nr$$

or $\quad$ (2)

$$q \approx nr$$

One way of avoiding this result would be to arrange that $$q>nr_{max}$$

and $\quad$ (3)

$$p_{max}>(n+1)r_{max}$$

These rules (3) are consistent with $$p-q=r$$

They give the desired difference frequency $r$ and avoid beats but have the disadvantage that very high values of $p$ and $q$ are needed; for instance when $r_{max}$ is 25 mc./s. its fifth harmonic will be 125 mc./s. and the range of $q$ must lie above this value while the range of $p$ must lie above 150 mc./s. if beats with the fifth harmonic are to be avoided.

The problem can be resolved with lower values of $p$ and $q$ if we make $q$ variable in discontinuous steps at intervals having a small width $s$ and at the same time make $p$ variable through a range equal to $s$. The requisite values of $q$ can be obtained as harmonics of the frequency of a crystal-controlled oscillator. Those of $p$ can be obtained by mixing one selected harmonic of a crystal-controlled oscillator with an oscillation of lower frequency which can be continuously varied throughout a range $s$. Errors in this lower frequency will constitute a relatively small percentage of the high frequency $p$; alternatively the comparison method referred to above may be employed, with the advantage that troublesome modulation products are avoided.

In order that condition (1) above may be avoided it is necessary to impose the rules:

$$p>1.5r_{max}$$

$$q_{min}>0.5r_{max} \quad (4)$$

Thus the harmonic $2_q$ will lie above $r_{max}$ and so will any higher harmonic of $q$ and any harmonic of $p$, while the difference $(p-q)$, which is $r$, can have any value less than $r_{max}$. Rules (4) are necessary in order to ensure that conditions (1) shall be avoided.

I have next to consider how conditions (2) can be avoided without resort to the frequently impracticable rules (3). I make $p$ continuously variable throughout a sub-range of width $s$ containing a definite value P which will be further discussed. Preferably the value P is at the centre of the sub-range, so that:

$$P+\tfrac{1}{2}s \geqslant p \geqslant P-\tfrac{1}{2}s \quad (5)$$

I now write $b$ for the value of $r$ which equals the lower boundary of the sub-range defined by values of $p$ lying between $(P+\tfrac{1}{2}s)$ and $(P-\tfrac{1}{2}s)$. There will thus be a value of $b$ corresponding to each value of $q$; in fact within this sub-range $$b=P-\tfrac{1}{2}s-q$$

I choose the boundaries $b$ so that $$b=ms \quad (6a)$$

where $m$ is any integer. We now make the rules $$q/b \text{ is not an integer} \quad (6b)$$

$$P=(n+1)ms \quad (6c)$$

where $n$ is another integer defining the nth harmonic of $r$. Whence it follows that $$q=\left(mn-\frac{1}{2}\right)s$$

$$=nb-\frac{1}{2}s$$

$$=(n+1)b-\frac{3}{2}s \quad (7)$$

$$q/b=n-\frac{1}{2M}$$

Since $s$ is relatively small and $b$ is relatively large, so that $\tfrac{1}{2}m$ is a fraction, rule (6b) is therefore satisfied. These rules may be illustrated by the following instance in which $P=51s$, $n=2$ and $m$ has in succession the values 16 and 17:

| $p$ | $q$ | $b$ | $r$ | $2_r$ |
|---|---|---|---|---|
| 50.5s to 51.5s | 34.5s | 16s | 16s to 17s | 32s to 34s |
| 50.5s to 51.5s | 33.5s | 17s | 17s to 18s | 34s to 36s |

In this example rule (6a) also is fulfilled, but any nth harmonic of $r$ can be avoided by means of rule (6b) even without (6a). But given both rules (6a) and (6c), which together imply (6b), a wider range of the harmonics of $r$ can be avoided.

The difference between $q$ and $nr$ at the bottom of any sub-range is $(nb-q)$, where $b$ and $q$ have the values assigned to that sub-range and this difference is $\tfrac{1}{2}s$ from Equation 7. The difference increases up to $(n+\tfrac{1}{2})s$ at the top of the sub-range. Even, therefore, if $n$ has its most unfavourable value—i. e. when $nr$, a harmonic of $r$, comes closest to $q$—the difference will still be $\tfrac{1}{2}s$, which can be made large enough to be filtered out if $s$ is suitably chosen. According to the invention the quantity $(n+1)$ in Equation 6c will be replaced by the lowest common multiple of two or more such quantities if more than one harmonic is to be avoided.

Figure 1:
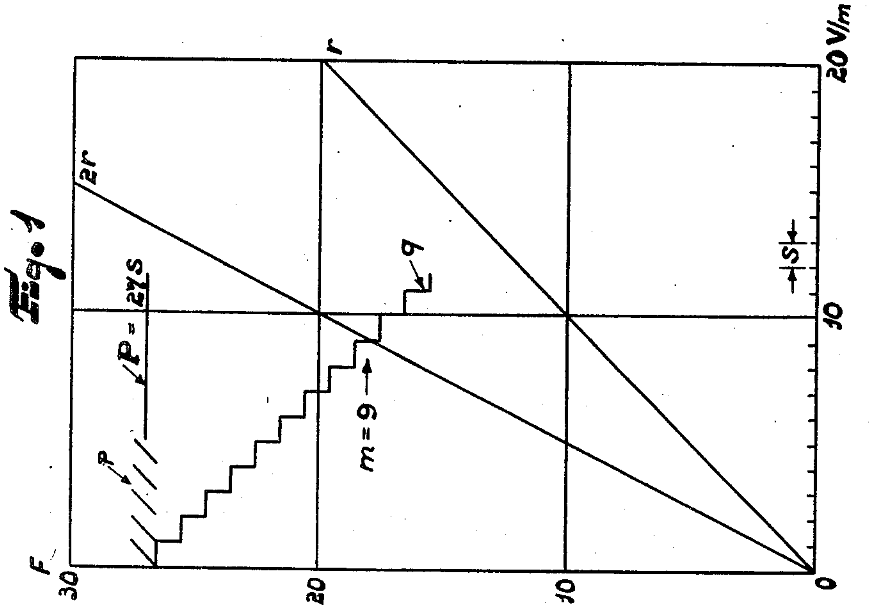

The invention will now be illustrated by reference to the accompanying drawing, in which:

Figures 1 and 2 are diagrams using values of the constant $m$ as abscissae and frequencies in terms of the unit $s$ as ordinates.

In Figure 1 it will be seen that, by Equation 6a, the successive steps on the axis of abscissae, marked with values of $m$, measure in terms of the unit $s$ the values of $r$ at the bottoms of successive sub-ranges of width $s$. The values of $q$ are represented, on the same scale as those of $r$, by the stepped graph marked "$q$." The value of $q$ is assumed to be 26.5s when $m=0$ and to decrease by an amount $s$ at each increase in the value of the integer $m$, i. e. at each boundary of a sub-range. The values of $r$ are equal to $ms$ at the bottoms of the successive sub-ranges, so that the graph representing $r$ as ordinate will be a straight line inclined to the axis of 45°. The graph representing the second harmonic, $r=2ms$, marked "2r" in the drawing, will be a straight line inclined to the horizontal axis at an angle whose tangent is 2. When $m=9$ so that $b=9s$ the value of $q$ drops from 18.5s to 17.5s and it thus misses by $\pm\tfrac{1}{2}s$ the corresponding value of $2r$, which is the ordinate of the curve marked "2r" when $m=9$. For this curve $n=2$, so that the requisite value of P, as found from Equation 6c, is 27s. P has the same value for all values of $m$, so that $p$ increases from 26.5s to 27.5s in the course of each sub-range, and it will be seen that $r=p-q$ throughout the graph marked "r."

Similarly Equation 6b must hold up to the highest value of $n$ for which harmonic interference is to be avoided. Hence, since Equation 6c is to hold for all these values of $n$, and since the value of $m$ is integral but otherwise indeterminate, the quantity P/s must be divisible by the lowest common multiple of all the corresponding values of $(n+1)$. Let us suppose that beats are to be avoided between $q$ and all harmonics of $r$ up to and including the fifth. Then the successive values of $(n+1)$ are 2, 3, 4, 5 and 6, and their lowest common multiple is 60. This lowest common multiple is the factorial of $n+1$, i. e. $(n+1)$. This, then, is the smallest permissible value of P/s. Let us choose $s$ to be 1 mc./s. Then the values of $m$ corresponding to the fundamental and successive harmonics are 30, 20, 15, 12 and 10.

The lowest common multiple must take into account all these harmonics of $r$ which would beat with $q$. When $r_{min}$ is small there are many such harmonics but as $r_{min}$ increases more of its harmonics lie above the range of $q$ and can be left out of account.

Next suppose that, with $s$ equal to 1 mc./s., $r$ ranges continuously from 2 to 25 mc./s. so that $m$ ranges discontinuously from 2 to 24 mc./s. Since P is now 60, $p$ will range from 59.5 to 60.5 mc./s. by Equation 5. If, then, we make the highest value of $q$ to be 57.5 mc./s., then $r$ or $(p-q)$ will range, as $p$ varies continuously throughout the step, from 2 to 3 mc./s. At this point we give $q$ the next value 56.5 mc./s., and thereafter $q$ decreases, in successive steps of 1 mc., down to 36.5 mc./s., which latter value gives a value of $r$ ranging from 24 to 25 mc./s. If, instead of adopting this arrangement, we had applied rules (3), then for the fifth harmonic of 25 mc./s. $q$ would have had to be greater than 125 and $p$ greater than 150 mc./s., so that rules (6) effect a marked improvement. This example is illustrated in Figure 2 of the drawing, in which the co-ordinates have the same meanings as in Figure 1 but different scales, and $q$ is represented as before by a stepped graph. In order, however, to make the drawing clearer a space of width $s$ has been substituted for the vertical line corresponding to each value of $m$. The change in the value of $q$, which takes place at each value of $m$, is shown in the middle of the appropriate inserted space. It will be seen that in each sub-range the interval between $q$ and any value of $r$ and its harmonics is at least 0.5 mc./s.

If necessary the requisite value of P could be reduced by using narrower sub-ranges and making $s$ equal to 0.2 mc./s., for instance. In this case the values of $q$ would approach the values of $r$ and its harmonics with a minimum interval of 0.01 mc./s. and the resulting beats would have to be removed by means of a high-pass filter with a narrower band than before, that is to say with a cut-off frequency of 0.1 instead of 0.5 mc./s.

On the other hand, when only the lower harmonics are to be avoided the value of P as calculated by taking the lowest common multiple of the values of $(n+1)$ may become too small to satisfy rule (4). In this case an integral multiple of the lowest common multiple may be used, or alternatively the magnitude of $s$ may be increased. Thus if only the fundamental, second and third harmonics need be avoided, Equation 6c and the principle of the lowest common multiple would give a value 12s for P. If, then, we increase the value of $s$ to 4 mc./s. the value of P becomes 48 mc./s., which satisfies condition (4) for a range of $r$ up to 25 mc./s. This permits the use of a simpler mixing circuit and a high-pass filter with a wider band than before.

What I claim is:

1. The method of combining a first frequency component with a second frequency component to produce a resultant beat frequency whereby a portion of the harmonic spectrum of said beat frequency, which portion has a predetermined highest harmonic order, may be prevented from beating with said frequency components, said method comprising the steps of generating a first frequency component whose frequency may be varied continuously within a predetermined range, one of the frequencies falling within said range having a value equal to the product of an integral multiple of the frequency width of said range times the factorial of the smallest integer which is larger than said highest harmonic order, generating a second frequency component whose frequency is variable in steps spaced in frequency to an extent corresponding to the frequency width of said range, and combining said first and second frequency components to produce said resultant beat frequency.

2. The method of combining a first frequency component with a second frequency component to produce a resultant beat frequency whereby a portion of the harmonic spectrum of said beat frequency, which portion has a predetermined highest harmonic order, may be prevented from beating with said frequency components, said method comprising the steps of generating a first frequency component whose frequency may be varied continuously within a predetermined range, the central frequency of said range having a value equal to the product of an integral multiple of the frequency width of said range times the factorial of the smallest integer which is larger than said highest harmonic order, generating a second frequency component whose frequency is variable in steps spaced in frequency to an extent corresponding to the frequency width of said range, and combining said first and second frequency components to produce said resultant beat frequency.

3. A method as set forth in claim 2 wherein the lowest frequency of said first frequency component is at least one and a half times the resultant beat frequency and wherein the lowest frequency of said second frequency component is at least one half as large as the resultant beat frequency.

4. The method of combining a first frequency component with a second frequency component to produce a resultant beat frequency whereby a portion of the harmonic spectrum of said beat frequency, which portion has a predetermined highest harmonic order, may be prevented from beating with said frequency components, said method comprising the steps of generating a first frequency component whose frequency may be varied continuously within a predetermined range, one of the frequencies falling within said range having a value equal to the product of an integral multiple of the frequency width of said range times the factorial of the smallest integer which is larger than said highest harmonic order, generating a second frequency component whose frequency is variable in steps spaced in frequency to an extent corresponding to the frequency width of said range and is equal to the difference between said one of the frequencies of the first frequency component and a frequency equal to one and a half times the frequency width of said range, and combining said first and second frequency components to produce said resultant beat frequency.

HERMAN BERNARD RUDOLF BOOSMAN.

References Cited in the file of this patent

UNITED STATES PATENTS

| Number | Name | Date |
|---|---|---|
| 2,380,288 | Bligh | July 10, 1945 |
| 2,398,694 | Case | Apr. 16, 1946 |
| 2,483,311 | Blok | Sept. 27, 1949 |

FOREIGN PATENTS

| Number | Country | Date |
|---|---|---|
| 486,448 | Great Britain | June 2, 1938 |